UNITED STATES PATENT OFFICE.

ARTHUR HAUSDÖRFER, OF ELBERFELD, AND CARL HEIDENREICH, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

DYE OF THE TRIPHENYLMETHANE SERIES.

1,026,089.  Specification of Letters Patent.  Patented May 14, 1912.

No Drawing.  Application filed December 13, 1910. Serial No. 597,124.

*To all whom it may concern:*

Be it known that we, ARTHUR HAUSDÖRFER and CARL HEIDENREICH, doctors of philosophy, chemists, citizens of the German Empire, residing, respectively, at Elberfeld and Leverkusen, near Cologne, Germany, have invented new and useful Improvements in Dye of the Triphenylmethane Series, of which the following is a specification.

We have found that new and valuable triphenylmethane dyestuffs capable of being chromed after dyeing are obtained by benzylating the amino group of the leuco compounds obtained from 1 molecule of a meta-aminobenzaldehyde which may be substituted in the benzene nucleus such as 2.6. dichloro-5-amidobenzaldehyde, 4-amido-2-toluylaldehyde, 5-amidobenzaldehyde-2-sulfonic acid, and 2 molecules of an aromatic oxycarboxylic acid and oxidizing the benzylated leuco compounds either directly or after being sulfonated. The dyestuffs thus produced having probably the following general formula:

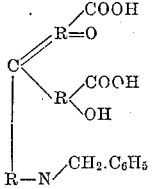

in which R stands for an aryl radical, are mordant dyestuffs, they dye wool from acid baths in red shades, which after treatment with chromates change into blues remarkable for their excellent fastness to milling, potting and light.

In order to illustrate the new process more fully the following examples are given, the parts being by weight:—

Example 1: In a vessel provided with a reflux condenser and a steam jacket 90 parts of the leuco compound produced from 1 molecule of ortho-chloro-meta-aminobenzaldehyde and 2 molecules of ortho-cresotinic acid are dissolved at 50° C. in 500 parts of water and 54 parts of calcined soda and 56 parts of benzyl chlorid are allowed to run into this solution while the mixture is being well stirred. It is then slowly heated to boiling and the boiling is continued for a few hours. Unchanged benzyl chlorid is removed by means of a current of steam and from the cooled solution the benzylated leuco compound is precipitated with sulfuric acid, filtered off, washed with water and dried. The leuco compound thus obtained has a slightly reddish color and is scarcely soluble in water and in weak acids, but easily soluble in dilute alkalis. The sodium salt crystallizes from the concentrated aqueous solution in colorless leaflets. For the oxidation 63 parts of the dried benzylated leuco compound are dissolved in 300 parts of concentrated sulfuric acid and into this mixture a solution of 7 parts of sodium nitrite in 100 parts of concentrated sulfuric acid is added. The mixture while being stirred is heated to 50° C. until the quantity of the dyestuff produced does no longer increase. The sulfuric acid solution is poured on ice, the precipitate which separates is filtered off, washed with water and dried. The dyestuff thus obtained, having probably the following formula:

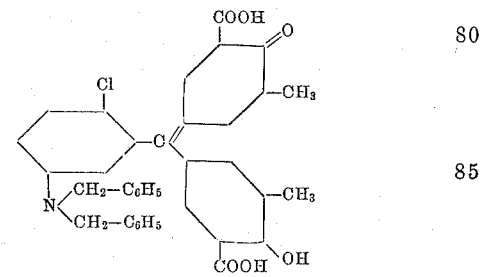

is a red powder which is almost insoluble in water and is soluble in dilute soda solution with a yellowish-brown color and in dilute caustic soda with a blue-violet color. It dyes wool from acid baths a dull red, which when treated with chromates changes into a blue very fast to milling, potting and light.

When a benzylated leuco compound chiefly consisting of monobenzyl compound is used for oxidation, a blue of similar properties is obtained. For the manufacture of the sulfonic acids the dyes can be treated in the usual manner with fuming sulfuric acid or the benzylated leuco compound can be first sulfonated and then oxidized or the sulfonation and oxidation can be performed in one operation in fuming sulfuric acid.

Example 2: 63 parts of the dried dibenzylated leuco compound from ortho-chloro-meta-aminobelzaldehyde and 2 molecules of ortho-cresotinic acid are dissolved in 250 parts of monohydrated sulfuric acid. 60 parts of 65 per cent. fuming sulfuric acid are allowed to run into this solution at 10–15° C. while the solution is being cooled and well stirred and the stirring is continued at the same temperature for half an hour. After this 240 parts of sulfuric acid (60° Bé.) and a solution of 7 parts of sodium nitrite in 100 parts of concentrated sulfuric acid are added to the mixture which is then heated to 50° C. until the oxidation is finished. The solution is poured into a mixture of ice and water, the precipitate which separates is filtered off and dried after the sulfuric acid has been removed by washing with a solution of sodium chlorid. The dyestuff forms after pulverizing a red powder, difficultly soluble in hot water with a red color and soluble in a dilute caustic soda with a bluish-violet color. It dyes wool in acid baths in yellowish-red shades, which when treated with chromates change into a blue having a brilliant bloom and of good fastness.

Example 3: 49 parts of the leuco compound prepared from 1 molecule of meta-amino-benzaldehyde-ortho-sulfonic acid and 2 molecules of ortho-cresotinic acid are dissolved in 200 parts of water and 17 parts of calcined soda and treated with 28 parts of benzyl chlorid as described in Example 1. The separated benzylated leuco compound is filtered off and dried. It is an almost colorless crystallized powder, which is difficultly soluble in hot water and easily soluble in weak alkalis. For converting it into the dyestuff 70 parts of the benzylized leuco compound are dissolved in 350 parts of concentrated sulfuric acid and oxidized at 50° C. with a solution of 7 parts of sodium nitrite in 100 parts of concentrated sulfuric acid. The deep red solution of the oxidized product is poured on ice, the dyestuff which separates is then filtered off, washed with a solution of sodium chlorid in order to remove the sulfuric acid and dried. The dyestuff when powdered is a brownish-red powder, which is soluble in hot water with a red color, in dilute soda solution with a yellow-brown color and in dilute caustic soda lye with a blue-violet color. It dyes wool from acid bath in red shades, which when treated with chromates change into a blue with brilliant bloom and of very good fastness to milling, potting and to light.

We claim: —

1. The herein-described new mordant dyestuffs of the triphenylmethane series characterized by having probably in their molecule the following group:

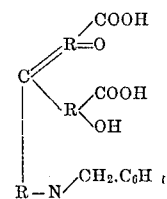

in which R stands for an aryl radical which dyestuffs are after being dried and pulverized dark powders, their alkaline salts and the alkaline salts of their sulfonic acids being soluble in water and in dilute solutions of sodium carbonate with from a yellow to brown coloration; dyeing wool from acid baths generally red shades which on being treated with bichromate change into a blue fast to fulling, potting and light, substantially as described.

2. The herein described dibenzylated dyestuff having probably the formula:

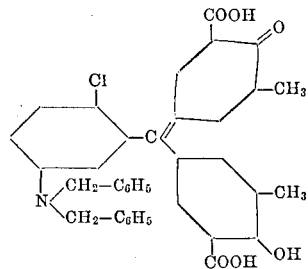

which is after being dried and pulverized a red powder scarcely soluble in water and soluble in a dilute solution of sodium carbonate with a yellowish-brown color; its sulfonic acid being soluble in dilute caustic soda lye with a bluish-violet coloration, dyeing wool from acid bath a red shade which on being treated with bichromate changes into a blue fast to fulling, potting and to light, substantially as described.

In testimony whereof we have hereunto set our hands in the presence of two subscribing witnesses.

ARTHUR HAUSDÖRFER. [L. S.]
    CARL HEIDENREICH. [L. S.]

Witnesses:
 WALTER VONNEGUT,
 ALFRED HENKEL.

---

Copies of this patent may be obtained for five cents each, by addressing the "Commissioner of Patents, Washington, D. C."